Dec. 30, 1941.  H. NERWIN  2,268,341
SUNSHADE
Filed March 9, 1939  2 Sheets-Sheet 1

Inventor
Hubert Nerwin
BY B. Singer & F. Stein
Attys.

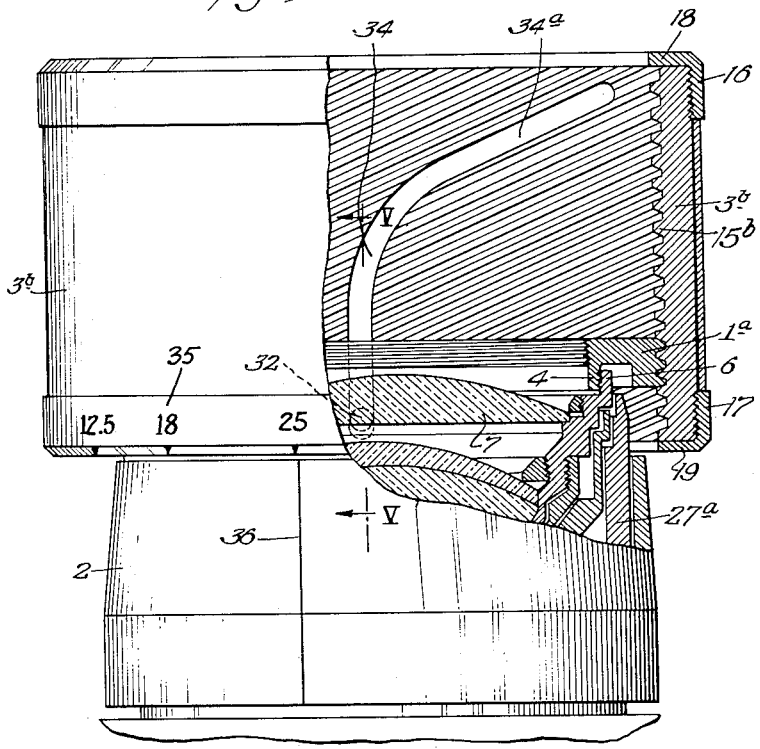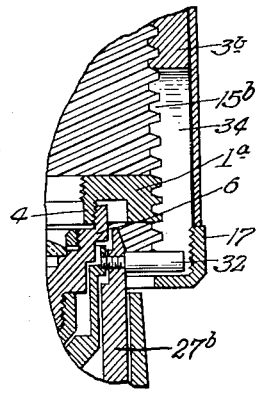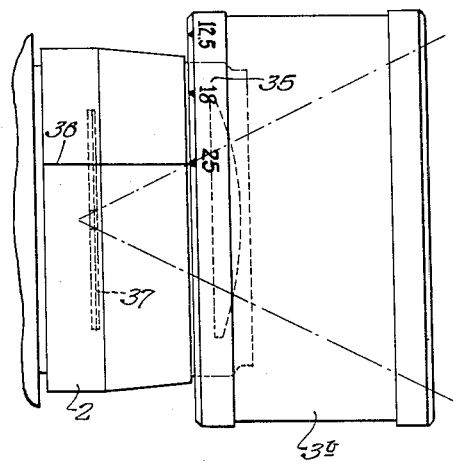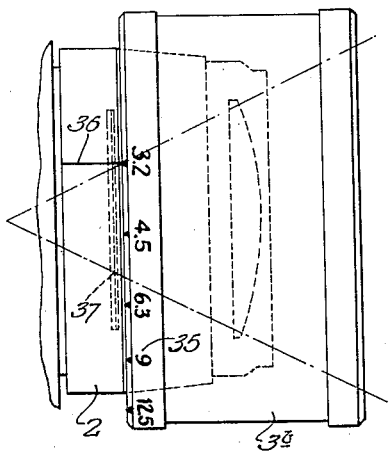

Patented Dec. 30, 1941

2,268,341

UNITED STATES PATENT OFFICE 2,268,341

SUNSHADE

Hubert Nerwin, Dresden-Reick, Germany, assignor to Zeiss Ikon Aktiengesellschaft, Dresden, Germany Application March 9, 1939, Serial No. 260,738
In Germany April 14, 1938

7 Claims. (Cl. 95—64)

The invention relates to improvements in sunshades for the lenses of photographic and motion picture cameras.

Sunshades of this type consist usually of a tubular member which is removably attached to the lens mount or on the front wall of the camera casing. When the camera has been used and is to be folded together or packed away in its carrying case it is necessary to remove the sunshade from the camera.

It is the principal object of the invention to provide a sunshade which needs not be removed from the camera when the same is to be folded together or packed away. According to the invention the sunshade is provided with a telescopic tubular member of such a size that it may be moved from its extended operative position axially rearwardly over the lens mount, so that it surrounds the lens mount in its inoperative position.

Another object of the invention is to provide the sunshade with a supporting member adapted to be secured to the front end of the lens mount and on which the tubular member is adjustably secured so as to be supported by said member in operative and inoperative position.

It is also an object of the invention to provide the supporting member of the sunshade with means for attaching thereto a filter mount.

Another object of the invention is to provide an adjustable sunshade whose projection beyond the lens is adjustable in accordance with the setting of the variable diaphragm of the lens.

Still another object of the invention is an adjustable sunshade which is operatively coupled with the diaphragm setting means of the lens, so that the sunshade is automatically adjusted whenever the aperture of the lens diaphragm is varied.

Other objects of the invention will become apparent from the following description with reference to the accompanying drawings which illustrate a few embodiments of the invention.

In the drawings:

Fig. 4 illustrates an adjustable sunshade which is operatively connected with the diaphragm setting ring of the lens.

Fig. 5 is a sectional view on the line VII—VII of Fig. 4.

Fig. 6 illustrates the sunshade of Fig. 4 in its farthest extended position, and Fig. 7 illustrates the sunshade of Fig. 4 partly extended when the diaphragm is adjusted to its largest aperture.

Figure 1:
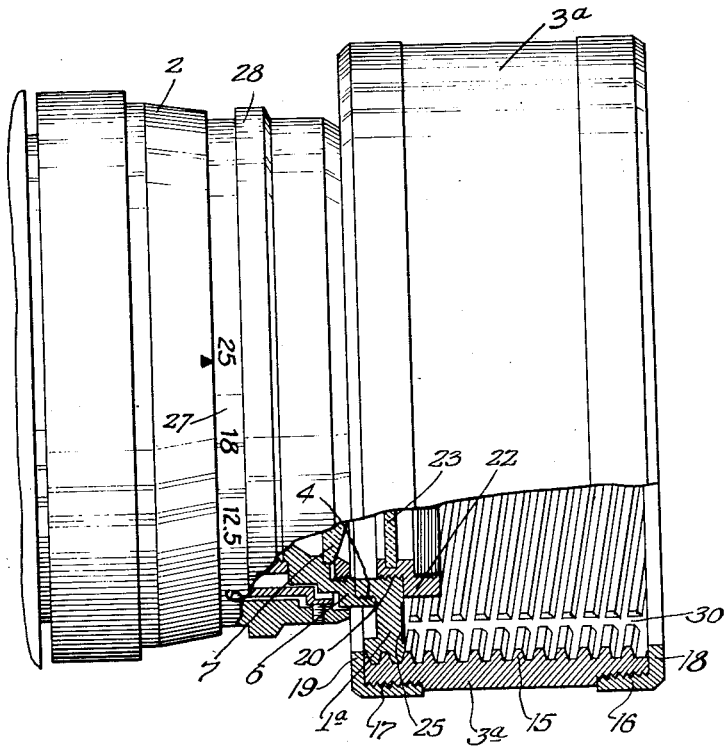
Fig. 1 is an elevation view, partly in section of a photographic objective provided with a sunshade, in extended or operative position.

Referring to Fig. 1, the sunshade comprises a supporting ring 1ª adapted to be secured to the lens mount 2, and a tubular member 3ª, which is adjustably secured to the outer circumference of the supporting ring 1ª.

The supporting ring 1 has an annular flange 4 projecting from its inner circumference and provided with an exterior thread adapted to be screwed into a corresponding interior thread provided at the front end of the mounting ring 6 for the front lens 7 of the photographic objective.

Figure 2:
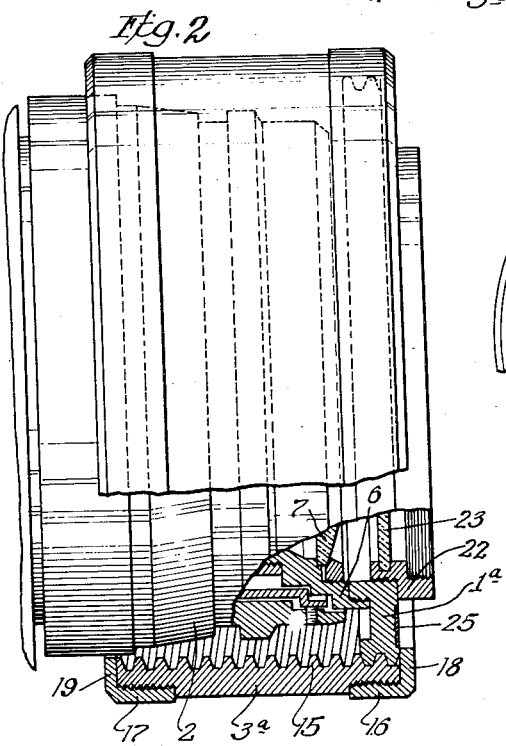
Fig. 2 illustrates the sunshade in its inoperative position on the photographic objective.

A tubular member 3ª is connected with the outer circumference of the supporting ring 1ª by means of a thread 15. Preferably a multiplex thread 15 having a high pitch is employed, so that the tubular shade member 3ª can be moved by a relatively short rotative movement from its extended operative position, illustrated in Fig. 1 to its retracted inoperative position illustrated in Fig. 2.

The ends of the tubular member 3ª have rings 16 and 17 respectively attached thereto, each of which is provided with an inwardly extended flange 18 and 19 respectively, which form stops for limiting the axial movement of the tubular member 3ª with respect to the supporting ring 1ª.

In order to adapt the sunshade for the attachment of a color filter or polarizing filter, the supporting ring 1ª is provided with an interior thread 20 for receiving an exteriorly threaded mounting ring 22 in which a filter 23 is secured.

It is also possible to provide the light filter with a mounting ring which is clamped between the outer end of the tubular member 3ª and the flange 18 of the ring 16, in which case the ring 16 holds the mounting ring in position.

Although the picture angle of the photographic objective is independent of the size of the diaphragm aperture of the objective, it still is advisable to advance the sunshade to a more advanced position when the diaphragm aperture is adjusted to a smaller size as when the diaphragm aperture is adjusted to a large or its largest size. If the diaphragm aperture is adjusted to its largest size and the sunshade occupies a position which would just permit a full illumination of the image area without extending into the picture angle and when then the diaphragm aperture is adjusted to a smaller size, the marginal light rays just outside of the conical light beam representing the picture angle are permitted to enter the objective and give rise to disturbing reflections within the same. While these marginal rays are desirable at the larger diaphragm aperture to illuminate the marginal portions of the image they are nevertheless objectionable at smaller diaphragm apertures and should be cut off by a corresponding advancement of the sunshade.

Figure 3:
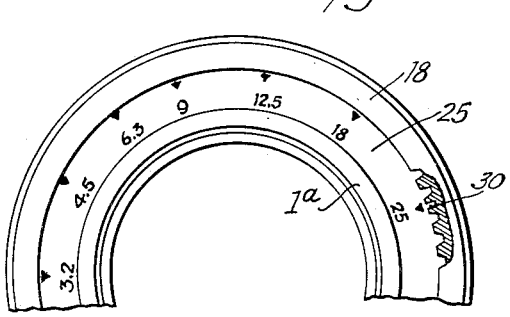
Fig. 3 is a front view of the sunshade illustrated in Fig. 1 with a portion broken away.

The present invention lends itself admirably for adjusting the axially movable shade-forming tubular member 3ª in accordance with the setting of the diaphragm aperture, so that the front end of the sunshade can be adjusted to such a position that it just permits the passage of the conical light beam. In order to adjust the extension of the sunshade in accordance with the setting of the lens diaphragm the outer end face of the supporting ring 1ª is provided with a diaphragm scale 25 (Fig. 3) and the rotatable tubular member 3ª is provided with an index which may be brought opposite any scale division of the scale 25. When the lens diaphragm is adjusted to a certain aperture, which is indicated by the diaphragm scale 27 on the diaphragm adjusting ring 28 of the lens mount 2, the sunshade may be adjusted to its most favorable position by rotating the tubular member 3ª until its index, formed in the present instance by an axial groove 30 on the inner wall of the tubular member 3ª, is brought opposite a similar scale division of the scale 25 on the supporting ring 1ª.

While in this embodiment of the invention the sunshade is independently adjusted with respect to the diaphragm adjustment of the lens, it is also possible to operatively connect the diaphragm adjusting means with the adjustable sunshade. Such a modification of the invention is illustrated in Figs. 4 to 7.

Referring to Figs. 4 and 5, the supporting ring 1ª of the sunshade is screwed with its exteriorly threaded flange 4 into the mounting ring 6 of the front lens 7 of the photographic objective, in the same manner as in the other embodiments of the invention. The shade-forming tubular member 3ᵇ has a multiplex thread 15ᵇ engaging a corresponding thread on the outer circumference of the supporting ring 1ª. With reference to Fig. 5 it will be noted that the customary rotatable diaphragm adjusting ring 27ᵇ on the lens mount 2 is provided with a radially outwardly extending pin 32 projecting into a curved guide slot 34 in the wall of the tubular member 3ᵇ. The outer circumference of the tubular member 3ᵇ is provided with a scale 35 indicating diaphragm apertures and the lens mount 2 has an axially extending line 36 forming an index cooperating with the scale 35. The pin 32 and the curved slot 34 form the operative connection between the adjustable lens diaphragm 37 (Figs. 6 and 7) and the sunshade 3ᵇ. In the position of the parts as illustrated in Figs. 5 and 6 the sunshade 3ᵇ is in its farthest advanced position with the lens diaphragm adjusted to its smallest aperture 1:25. When rotating the sunshade in anti-clockwise direction, the aperture of the lens diaphragm increases in size and the sunshade 3ᵇ is moved rearwardly over the lens mount 2. Fig. 7 illustrates the position of the parts when the lens diaphragm 37 has been adjusted to its largest aperture 1:3.2. Upon further anti-clockwise rotation of the tubular member 3ᵇ the pin 32 remains stationary and enters the upper portion 34ª of the curved slot 34, which follows substantially the pitch of the thread 15, thus permitting a complete retraction of the tubular member 3ª until its flange 18 engages the upper end face of the supporting ring 1ª.

What I claim as my invention is:

1. In combination with a photographic objective provided with an adjustable diaphragm and a rotatable diaphragm adjusting ring, an axially adjustable sunshade attached to the mount of said photographic objective, and means operatively connecting said diaphragm adjusting ring with said axially adjustable sunshade for automatically adjusting the aperture of the diaphragm in accordance with the axial position of the sunshade with respect to the photographic objective.

2. In combination with a photographic objective provided with an adjustable diaphragm and a rotatable diaphragm adjusting ring, an axially adjustable tubular member forming a sunshade attached to the mount of said photographic objective, and means operatively connecting said diaphragm adjusting ring with said axially adjustable tubular member for automatically adjusting the aperture of the diaphragm in accordance with the axial position of the tubular member with respect to the photographic objective, said operatively connecting means including a pin on said diaphragm adjusting ring and a slot in said tubular member in which said pin engages.

3. In combination with a photographic objective provided with an adjustable diaphragm and a rotatable diaphragm adjusting ring, an axially adjustable tubular member forming a sunshade attached to the mount of said photographic objective, and means operatively connecting said diaphragm adjusting ring with said axially adjustable tubular member for automatically adjusting the aperture of the diaphragm in accordance with the axial position of the tubular member with respect to the photographic objective, said operatively connecting means including a pin on said diaphragm adjusting ring and a slot in said tubular member in which said pin engages, said slot permitting an independent movement of said tubular member into its completely retracted inoperative position after the diaphragm has been adjusted by said tubular member to its largest aperture, said tubular member in its inoperative position surrounding the photographic objective mount.

4. In combination with a photographic objective provided with an adjustable diaphragm and a rotatable diaphragm adjusting ring, a sunshade including an axially adjustable tubular member and a supporting ring for the same, said supporting ring being attached to the mount of said objective and having its outer circumference provided with a thread engaging a corresponding thread on the inner wall of said tubular member, whereby upon rotation of said tubular member the same is axially displaced with respect to said supporting ring, and means operatively connecting said diaphragm adjusting ring with said tubular member for automatically adjusting the aperture of the said lens diaphragm in accordance with the axially extended position of the tubular member with respect to the photographic objective.

5. In combination with a photographic objective provided with an adjustable diaphragm and a rotatable diaphragm adjusting ring, a sunshade including an axially adjustable tubular member and a supporting ring for the same, said supporting ring being attached to the mount of said objective and having its outer circumference provided with a thread engaging a corresponding thread on the inner wall of said tubular member, whereby upon rotation of said tubular member the same is axially displaced with respect to said supporting ring, and means operatively connecting said diaphragm adjusting ring with said tubular member for automatically adjusting the aperture of the said lens diaphragm in accordance with the axially extended position of the tubular member with respect to the photographic objective, said operatively connecting means including a pin on said diaphragm adjusting ring and a slot in said tubular member in which said pin engages.

6. In combination with a photographic objective provided with an adjustable diaphragm and a rotatable diaphragm adjusting ring, a sunshade including an axially adjustable tubular member and a supporting ring for the same, said supporting ring being attached to the mount of said objective and having its outer circumference provided with a thread engaging a corresponding thread on the inner wall of said tubular member, whereby upon rotation of said tubular member the same is axially displaced with respect to said supporting ring, and means operatively connecting said diaphragm adjusting ring with said tubular member for automatically adjusting the aperture of the said lens diaphragm in accordance with the axially extended position of the tubular member with respect to the photographic objective, said operatively connecting means including a pin on said diaphragm adjusting ring and a slot in said tubular member in which said pin engages, said slot permitting an independent movement of said tubular member into its completely retracted inoperative position after the diaphragm has been adjusted by said tubular member to its largest aperture, said tubular member in its inoperative position surrounding the photographic objective mount.

7. In combination with a photographic objective provided with an adjustable diaphragm and a rotatable diaphragm adjusting ring, a sunshade including an axially adjustable tubular member and a supporting ring for the same, said supporting ring being attached to the mount of said objective and having its outer circumference provided with a thread engaging a corresponding thread on the inner wall of said tubular member, whereby upon rotation of said tubular member the same is axially displaced with respect to said supporting ring, means operatively connecting said diaphragm adjusting ring with said tubular member for automatically adjusting the aperture of the said lens diaphragm in accordance with the axially extended position of the tubular member with respect to the photographic objective, and a diaphragm scale on said tubular member cooperating with an index on said objective mount.

HUBERT NERWIN.